Aug. 4, 1964    V. H. JUNGJOHANN    3,143,037
SLIDE PROJECTOR INTERLOCK SYSTEM FOR THE
SLIDE-CHANGING AND EDITING MECHANISMS
Filed Feb. 23, 1962    2 Sheets-Sheet 1

Vernon H. Jungjohann
INVENTOR.

BY R. Frank Smith
Steve W. Grambau
ATTORNEYS

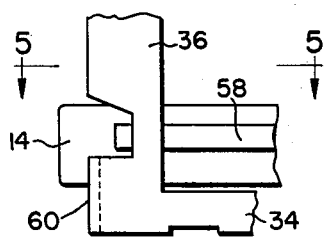
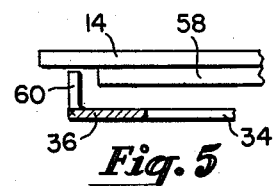
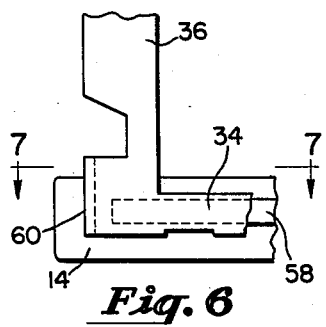
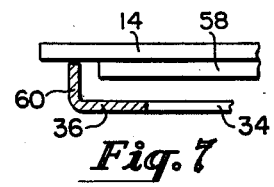
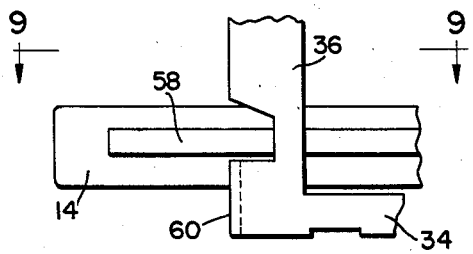
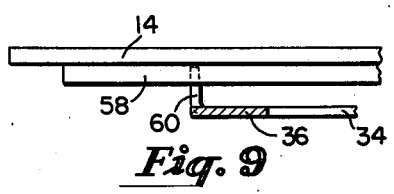
Vernon H. Jungjohann
INVENTOR.

United States Patent Office 3,143,037
Patented Aug. 4, 1964

3,143,037
SLIDE PROJECTOR INTERLOCK SYSTEM FOR THE SLIDE-CHANGING AND EDITING MECHANISMS
Vernon H. Jungjohann, Rochester, N.Y., assignor to Eastman Kodak Company, Rochester, N.Y., a corporation of New Jersey
Filed Feb. 23, 1962, Ser. No. 175,217
3 Claims. (Cl. 88—28)

This invention relates generally to slide projectors, and more specifically to an interlock system for the slide-changing and editing mechanisms of a slide changer.

In slide projectors of the type having a viewing position and a slide-changing mechanism for moving a slide to and from the viewing position, and an editing mechanism for moving a slide out of the viewing position for editing, an interlock system is required between the slide-changing and editing mechanisms to prevent simultaneous operation of these mechanisms which would otherwise result in jamming the slide projector and possibly damaging the projected slide and slide projector parts. To obviate such jamming and possible damaging of the slide and projector parts, applicant is providing an improved interlock system between the slide-changing and editing mechanisms to prevent the operation of one of these mechanisms until the other has completed its operation.

It is therefore one of the primary objects of the present invention to provide an interlock system for a slide projector to prevent simultaneous operation of the slide-changing and editing mechanisms.

Another object of the present invention is to provide an improved interlock system for a slide projector that is of simple design and construction, thoroughly reliable and efficient in operation, and economical to manufacture.

A more specific object of the invention is to provide an improved slide projector having slide-changing and editing mechanisms provided with co-operating parts forming an interlock system to prevent the operation of one of these mechanisms once the other mechanism has started its cycle of operation until the completion of that cycle.

Objects and advantages other than those set forth above will be apparent from the following description when read in connection with the accompanying drawings, in which:

FIG. 4 is an enlarged fragmentary view of the interlock system as shown in FIG. 1;

FIG. 5 is a fragmentary view partially in section taken along line 5—5 of FIG. 4;

FIG. 6 is an enlarged fragmentary view of the interlock system as shown in FIG. 2;

FIG. 7 is a fragmentary view partially in section taken along line 7—7 of FIG. 6;

FIG. 8 is an enlarged fragmentary view of the interlock system as shown in FIG. 3; and FIG. 9 is a fragmentary view partially in section taken along line 9—9 of FIG. 8.

Figure 1:
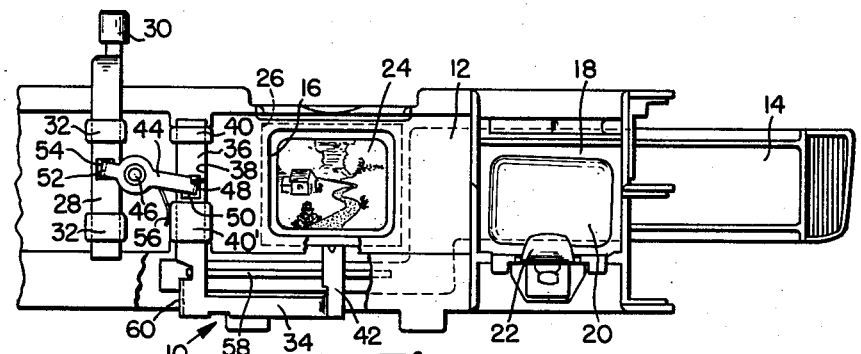
FIG. 1 is a fragmentary side elevation view of a slide projector with a portion thereof broken away and with the slide-changing and editing mechanisms in their inoperative positions.

As shown in the drawings, a preferred embodiment of the invention is incorporated in a slide changer 10 of known type for use in connection with a slide projector, not shown. The slide changer 10 comprises an elongated hollow housing 12 supporting a slide changer plate 14 for reciprocal movement through a cycle of operation, to and from a viewing aperture 16. The slide changer 10 further has a slide take-up magazine 18 on one side thereof, the slides being held therein by a spring-biased pressure plate 20 manually movable by a handle 22 as is well known in the art. A similar slide supply magazine, not shown, is positioned on the opposite side of slide changer 10 in alignment with take-up magazine 18. This slide changer 10 may be releasably secured to a slide projector, not shown, in a well known manner with the viewing aperture 16 in alignment with the optical system of the projector. Thus, when a slide 24 is moved from supply magazine 18 to viewing aperture 16 by slide changer plate 14, an enlarged representation thereof is projected onto a screen, not shown.

Figure 2:
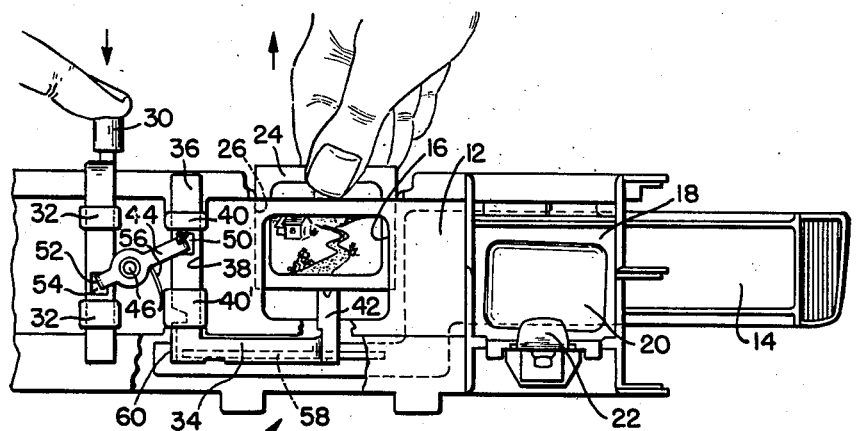
FIG. 2 is a view similar to FIG. 1 with the slide-changing mechanism in its inoperative position and the editing mechanism in its operative position.

The slide changer 10 further has an editing mechanism movable from a normal inoperative position to an operative position for lifting a slide 24 out of viewing aperture 16 through an opening 26, shown dotted, in housing 12 located above aperture 16, and back to its inoperative position to complete a cycle of operation. This editing mechanism essentially comprises a straight actuating lever 28 having a button 30 at one end and being guided for reciprocal, slidable movement by apertured bosses 32 integrally formed with housing 12. The editing mechanism further comprises a substantially U-shaped editing lever 34, one arm 36 thereof being slidably movable in a groove 38 formed in housing 12 and retained therein by apertured bosses 40, 40' integrally formed with housing 12, and the other arm 42 being disposed below viewing aperture 16 and adapted to engage the underside of slide 24 as seen in FIG. 2. The actuating and editing levers 28, 34 respectively are interconnected by means of a straight lever 44 pivoted at 46 and having one bent end 48 thereof extending through an opening 50 in arm 36 of the editing lever 34, and the opposite bent end 52 of lever 44 extending through an opening 54 in actuating lever 28. A spring 56 biases lever 44 in a clockwise direction, and hence holds levers 28, 34 of the editing mechanism in their normal inoperative positions as seen in FIG. 1. In the operation of this editing mechanism, should the operator desire to edit a slide 24 that is in viewing aperture 16, he merely depresses actuating lever 28 by pressing on button 30 as seen in FIG. 2 thereby pivoting lever 44 against the bias of its spring 56 causing the editing lever 34 to move upwardly and arm 42 to lift slide 24 out of aperture 16 through opening 26.

Figure 3:
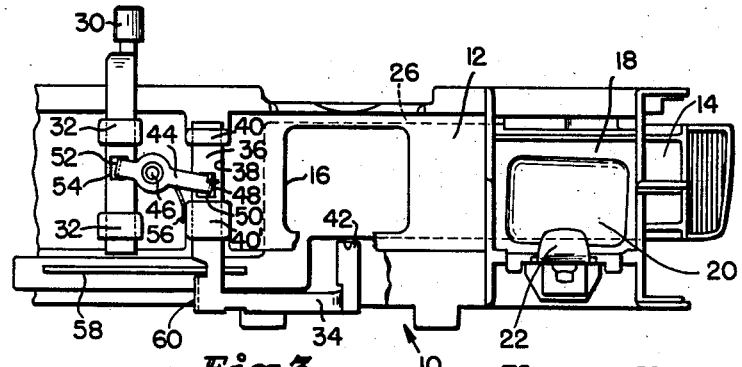
FIG. 3 is a view similar to FIG. 1 with the slide-changing mechanism in its operative position, and the editing mechanism in its inoperative position.

The slide changer further has an interlock system incorporated therein to prevent the operation of either the slide-changer plate 14 or the levers 28, 34 once the other has begun its cycle of operation until the completion of that cycle. This system is best shown in FIGS. 4-9, and essentially comprises elongated rib 58 extending from the face of changer plate 14 adjacent its lower edge, and a turned-in lip 60 on the lower end of arm 36. When the slide-changing and editing mechanisms are in their inoperative positions, as seen in FIG. 1, the rib 58 and lip 60 are in the positions shown in FIGS. 4 and 5 and hence it is obvious that either mechanism may be operated without interference by the other. Let us assume now that a slide 24 is in viewing aperture 16 and the operator desires to edit it. He would then depress actuating lever 28 as seen in FIG. 2 moving the editing mechanism into its operative position for editing the slide. The rib 58 and lip 60 of the interlock system would then assume the position shown in FIGS. 6 and 7 with lip 60 blocking any forward movement of plate 14 and rib 58. It should be clear from this that shortly after the editing mechanism initiates a cycle of operation until a short time before completion thereof, lip 60 will be disposed or positioned in front of rib 58 and will prevent movement of slide changer plate 14 in a direction toward viewing aperture 16. On the other hand, shortly after the operator has initiated movement of slide changer plate 14 toward viewing aperture 16, as seen in FIG. 3, for movement through a cycle of operation, until shortly before completion thereof, rib 58 of the interlock system will be positioned above lip 60 as seen in FIGS. 8 and 9 for effectively blocking any possible movement of the editing mechanism.

Although but one embodiment has been illustrated and described, it will be apparent to those skilled in the art that various changes and modifications may be made therein without departing from the spirit of the invention or from the scope of the appended claims.

I claim:

1. In an interlock for a slide changer having a viewing position, the combination comprising:
   (a) transport means movable from an inoperative position through a cycle of operation for transporting a slide over a first path to and from said viewing position,
   (b) editing means movable from an inoperative position through a cycle of operation for moving said slide from and to said viewing position over a second path transverse to said first path, and
   (c) co-operating means interlocking said transport and editing means and including a rib on said transport means and a lip on said editing means co-operating upon initiation of the cycle of one of said two means for preventing movement of the other of said two means to a position which would interfere with the initiated cycle, so long as said initiated cycle is in progress.

2. The invention according to claim 1 wherein said transport means comprises an elongated reciprocally movable plate, said editing means comprises a slide member reciprocally movable transversely of said plate, said rib on said interlocking means is elongated, said lip on said editing means blocking said rib to prevent the operation of said transport means from its inoperative position while said editing means is moved from its inoperative position, said elongated rib blocking said lip to prevent the operation of said editing means from its inoperative position while said transport means is moved from its inoperative position.

3. The invention according to claim 2 wherein said editing means further comrpises a plunger reciprocally movable transversely of said plate, a U-shaped lever reciprocally movable transversely of said plate and one arm of which constitutes said slide member, and a pivotal link having one end connected to said plunger and the opposite end connected to said arm of said U-shaped lever whereby manual depression and retraction of said plunger moves said editing means through a cycle of operation.

References Cited in the file of this patent

UNITED STATES PATENTS

| 2,969,711 | Robinson et al. | Jan. 31, 1961 |
| 2,986,070 | Lacoe | May 30, 1961 |
| 3,079,840 | McMaster et al. | Mar. 5, 1963 |